United States Patent Office 3,634,438
Patented Jan. 11, 1972

3,634,438
PHENYLHYDRAZINE SALT OF MERCAPTO-PYRIDINE-N-OXIDE
Rudiger D. Haugwitz, Highland Park, N.J., and John Uhoch, Jr., Seymour, Conn., assignors to Olin Corporation
No Drawing. Filed Jan. 26, 1970, Ser. No. 5,914
Int. Cl. C07d 31/50
U.S. Cl. 260—294.8 G                     1 Claim

ABSTRACT OF THE DISCLOSURE

The phenylhydrazine salt of 2-mercaptopyridine-N-oxide is a novel composition of matter and is useful as a broad spectrum anti-bacterial and anti-fungal agent, especially against Gram-negative organisms.

---

This invention relates to the novel phenylhydrazine salt of 2-mercaptopyridine-N-oxide and to the method of controlling the growth of micro-organisms using this salt.

The salt of this invention is prepared by reacting substantially equimolar proportions of the reactants suitably dissolved in an aprotic inert reaction medium at temperatures from room temperature to 140° C. On cooling, the product crystallizes and is filtered or otherwise separated from the reaction medium. It is useful as separated or it is suitably recrystallized when greater purity is desired.

Suitable inert reaction media include, for example, benzene, toluene, xylenes, petroleum ether, cyclohexane, chloroform, carbon tetrachloride and tetrachloroethylene.

The reaction time is not critical and may vary from a few minutes to 10 hours or more. Usually from 0.1 to 5 hours is satisfactory.

The compound is useful as a chemotherapeutic agent and is suitably formulated in any suitable compositions in suitable proportions, as decongestant, ear drops, foot powders or troches as described in U.S. Pat. 2,713,049 at column 3, lines 22–62 or U.S. Pat. 2,742,393 from column 2, line 35 to column 3, line 10.

EXAMPLE I

To a solution of 2.5 g. (0.0197 mole) of 2-mercaptopyridine-N-oxide in 20 ml. of benzene was added a solution of 2.2 g. (0.022 mole) of phenylhydrazine in 5 ml. of benzene. The resulting precipitate was filtered off to yield 4.8 g. of initial product. Repeated crystallizations from ether furnished the analytically pure phenylhydrazine salt of 2-mercaptopyridine-N-oxide having a melting point of 72–74° C. with decomposition.

Calcd. for $C_{11}H_{13}N_3OS$ (percent): C, 56.15; H, 5.57; N, 17.86. Found (percent): C, 56.22, 56.36; H, 5.75, 5.84; N, 17.82, 17.53.

The broad spectrum of anti-bacterial and antifungal activity of the compound of this invention is shown in Table I and compared with several widely used commercial products. The advantage of the compound of this invention is clearly shown in Table I by its low minimum inhibitory concentration, especially against Gram-negative organisms.

TABLE I

| Organism No. | 1 | 2 | 3 | 4 | 5 | 6 |
|---|---|---|---|---|---|---|
| Gram | + | + | − | − | − | + |
| Product of Example I | 1.5 | 4.5 | 3.0 | 4.5 | 1.5 | 18.0 |
| t-Butyl ammonium salt (a) | <1.5 | 4.5 | >75 | 18.0 | | |
| Ammonium salt (a) | <1.5 | 3.0 | 12.0 | 6.0 | | |
| Acid (a) | <1.5 | 3.0 | 12.0 | 12.0 | | |
| Sodium salt(a) | <1.5 | 3.0 | 9.0 | 12.0 | 4.5 | 12.0 |
| Hydrazine salt(a) | 3.0 | 18.0 | 25.0 | 6.0 | 25.0 | 18.0 |
| Commercial products: | | | | | | |
| N-(3-chloroallyl) hexaminium chloride | 18.7 | 37.5 | 75.0 | 37.5 | 50.0 | |
| 3,4,5-tribromosalicyl anilide | 0.35 | 0.92 | 100 | 12.5 | 37.5 | |
| A mixture of 3,4′,5-tribromosalicylanilide and 12–20 percent 3,5-dibromosalicylanilide | 0.78 | 4.6 | 75.0 | 18.7 | 50.0 | |
| Sodium orthophenylphenate | 100 | 100 | 100 | 100 | 100 | |
| Pentachlorophenol, sodium salt | 0.87 | 3.0 | 75 | 75 | 100 | |

(a) Of 2-mercaptopyridine-N-oxide.
NOTE.—Organisms: (1) *Staphylococcus aureus* 209 P; (2) *Streptococcus faecalis* SC 164; (3) *Pseudomonas aeruginosa* SC 3840; (4) *Proteus vulgaris* SC 3855; (5) *Aerobacter aerogenes* SC 1678; (6) *Lactobacillus casei*.

What is claimed is:
1. Phenylhydrazine salt of 2-mercaptopyridine-N-oxide.

References Cited

UNITED STATES PATENTS 3,517,017   6/1970   Haugwitz _____ 260—294.8 G
3,517,018   6/1970   Haugwitz _____ 260—294.8 G ALAN L. ROTMAN, Primary Examiner U.S. Cl. X.R.

260—294.8 T; 424—263